(12) United States Patent
Ka et al.

(10) Patent No.: US 12,731,418 B2
(45) Date of Patent: Sep. 8, 2026

(54) ELECTRONIC DEVICE AND METHOD FOR CONTROLLING SAME

(71) Applicant: SAMSUNG ELECTRONICS CO., LTD., Suwon-si (KR)

(72) Inventors: Keehwan Ka, Suwon-si (KR); Jongyoub Ryu, Suwon-si (KR); Kyoungchoon Park, Suwon-si (KR); Minjin Song, Suwon-si (KR); Jeongwon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

(21) Appl. No.: 18/441,717

(22) Filed: Feb. 14, 2024

(65) Prior Publication Data

US 2024/0180361 A1 Jun. 6, 2024

Related U.S. Application Data

(63) Continuation of application No. PCT/KR2022/014049, filed on Sep. 20, 2022.

(30) Foreign Application Priority Data

Nov. 3, 2021 (KR) ........................ 10-2021-0149619

(51) Int. Cl.
*G06V 20/68* (2022.01)
*A47J 27/08* (2006.01)
(Continued)

(52) U.S. Cl.
CPC .......... *G06V 20/68* (2022.01); *A47J 27/0802* (2013.01); *A47J 36/32* (2013.01); *A47J 37/0641* (2013.01);
(Continued)

(58) Field of Classification Search
CPC ..................................................... G06V 20/68
See application file for complete search history.

(56) References Cited

U.S. PATENT DOCUMENTS

| | | | |
|---|---|---|---|
| 10,223,933 | B1 | 3/2019 | Cheng et al. |
| 10,521,903 | B2 | 12/2019 | Kang et al. |

(Continued)

FOREIGN PATENT DOCUMENTS

| | | | |
|---|---|---|---|
| CN | 101435601 | A | 5/2009 |
| CN | 105772961 | A | 7/2016 |

(Continued)

OTHER PUBLICATIONS

EPO, machine translation of KR101778561B1 (Sep. 14, 2017) (Year: 2017).*

(Continued)

*Primary Examiner* — David N Werner
(74) *Attorney, Agent, or Firm* — Sughrue Mion, PLLC

(57) ABSTRACT

Disclosed is a cooking apparatus including an image capturer for obtaining an image of food located in the cooking apparatus, a memory, and a processor configured to execute the instructions to cause the cooking apparatus to: obtain an image through the image capturer; obtain contamination level information according to a plurality of contamination detection techniques for detecting contamination of the image capturer based on the obtained image; identify a weight of the contamination level information based on at least one of a type of food or a cooking phase; obtain final contamination level information based on the contamination level information and the weight; and identify a contamination level of the image capturer based on the final contamination level information.

15 Claims, 14 Drawing Sheets

(51) Int. Cl.

| | |
|---|---|
| ***A47J 36/32*** | (2006.01) |
| ***A47J 37/06*** | (2006.01) |
| ***A47J 37/07*** | (2006.01) |
| ***A47J 37/10*** | (2006.01) |
| ***F24C 15/00*** | (2006.01) |
| ***G06T 7/00*** | (2017.01) |
| ***G06T 7/13*** | (2017.01) |
| ***H04N 23/52*** | (2023.01) |

(52) U.S. Cl.
CPC ............... *A47J 37/07* (2013.01); *A47J 37/10* (2013.01); *F24C 15/004* (2013.01); *G06T 7/0002* (2013.01); *G06T 7/13* (2017.01); *H04N 23/52* (2023.01); *G06T 2207/30128* (2013.01); *G06T 2207/30168* (2013.01)

(56) References Cited

U.S. PATENT DOCUMENTS

| | | | | |
|---|---|---|---|---|
| 2011/0011422 | A1 | 1/2011 | Jeon et al. | |
| 2015/0330640 | A1* | 11/2015 | Stork genannt Wersborg ............. | F24C 7/08 99/332 |
| 2018/0262667 | A1* | 9/2018 | Chen ...................... | H04N 23/71 |
| 2018/0288324 | A1* | 10/2018 | Lu .......................... | H04N 23/45 |
| 2021/0285633 | A1* | 9/2021 | Esmailzadeh .......... | A42B 1/242 |
| 2021/0285653 | A1* | 9/2021 | Bhogal ................... | F24C 7/085 |
| 2022/0015572 | A1* | 1/2022 | Cottrell ................... | F24C 15/04 |
| 2022/0104654 | A1* | 4/2022 | Wild ...................... | G06V 20/00 |
| 2022/0287498 | A1* | 9/2022 | Hua ....................... | G06V 20/68 |
| 2022/0311927 | A1* | 9/2022 | Ka .......................... | F24C 7/085 |

FOREIGN PATENT DOCUMENTS

| | | | | | |
|---|---|---|---|---|---|
| CN | 106791807 | B | | 10/2018 | |
| CN | 109584217 | A | | 4/2019 | |
| CN | 112006525 | A | * | 12/2020 | ............ G06F 18/24 |
| JP | 2006-170768 | A | | 6/2006 | |
| JP | 2007-189369 | A | | 7/2007 | |
| JP | 2015-70566 | A | | 4/2015 | |
| JP | 2020-530550 | A | | 10/2020 | |
| KR | 10-2007-0005959 | A | | 1/2007 | |
| KR | 20070005959 | A | * | 1/2007 | ............. H04M 1/22 |
| KR | 10-2011-0006824 | A | | 1/2011 | |
| KR | 10-1138453 | B1 | | 4/2012 | |
| KR | 10-1525516 | B1 | | 6/2015 | |
| KR | 10-2015-0076371 | A | | 7/2015 | |
| KR | 10-2017-0060972 | A | | 6/2017 | |
| KR | 10-1778561 | B1 | | 9/2017 | |
| WO | WO-2020120757 | A1 | * | 6/2020 | ............ G06F 18/41 |

OTHER PUBLICATIONS

EPO, machine translation of KR 10-2007-0005959 A (Jan. 11, 2007) (Year: 2022).*

International Search Report (PCT/ISA/210) issued by the International Searching Authority on Dec. 27, 2022 in corresponding International Application No. PCT/KR2022/014049.

Written Opinion (PCT/ISA/237) issued by the International Searching Authority on Dec. 27, 2022 in corresponding International Application No. PCT/KR2022/014049.

Communication dated Jan. 22, 2026, issued by the Korean Ministry of Intellectual Property in Korean Application No. 10-2021-0149619.

* cited by examiner

| TYPE OF FOOD | BEFORE COOKING | | | | FIRST STEP OF COOKING | | | | SECOND STEP OF COOKING | | | | ... | NTH STEP OF COOKING | | | |
|---|---|---|---|---|---|---|---|---|---|---|---|---|---|---|---|---|---|
| | FIRST WEIGHT | SECOND WEIGHT | THIRD WEIGHT | FOURTH WEIGHT | FIRST WEIGHT | SECOND WEIGHT | THIRD WEIGHT | FOURTH WEIGHT | FIRST WEIGHT | SECOND WEIGHT | THIRD WEIGHT | FOURTH WEIGHT | ... | FIRST WEIGHT | SECOND WEIGHT | THIRD WEIGHT | FOURTH WEIGHT |
| CHICKEN | 0 | 0 | 0 | 1 | 1 | 1 | 1.5 | 0.5 | 1 | 1 | 1.5 | 0.25 | ... | 1 | 1 | 1.5 | 1 |
| BEEF | 0 | 0 | 0 | 1 | 1 | 1 | 1 | 0.5 | 1 | 1 | 1 | 0.25 | ... | 1 | 1 | 1 | 1 |
| SALMON STEAK | 0 | 0 | 0 | 1 | 1 | 1.25 | 1 | 0.5 | 1 | 1.25 | 1 | 0.25 | ... | NO NTH STEP | | | |
| CROISSANT | 0 | 0 | 0 | 1 | 1.5 | 1.5 | 1 | 0.5 | 1.5 | 1.5 | 1 | 0.25 | ... | 1.5 | 1.25 | 1 | 1 |
| ... | | | | | | | | | | | | | | | | | |

ELECTRONIC DEVICE AND METHOD FOR CONTROLLING SAME

CROSS-REFERENCE TO RELATED APPLICATIONS

This application is a bypass continuation application of International Application No. PCT/KR2022/014049, filed on Sep. 20, 2022, which is based on and claims priority to Korean Patent Application No. 10-2021-0149619, filed on Nov. 3, 2021, in the Korean Patent Office, the disclosures of which are incorporated by reference herein in their entireties.

BACKGROUND

1. Field

The disclosure relates to an electronic device and a method for controlling the same and, more particularly to, a cooking apparatus to determine contamination of an image capturing unit located within the cooking apparatus by a plurality of contamination detection methods and a method for controlling the same.

2. Description of Related Art

When cooking a food inside a cooking apparatus like an oven, an air fryer, a microwave, there may be a case where an image, a video of the food needs to be obtained through a camera about how the cooking is performed, to improve level of completion of cooking.

In this case, due to splattering of oil and seasoning of food or generation of vapor from the food by a cooking operation (for example, heating) of a cooking apparatus, a camera lens, a transparent window located between a camera and the food to protect the camera, or the like, may be contaminated. When a lens of a camera and a transparent window, or the like, are contaminated, a distorted image or a video of the food may be obtained and it may be difficult to identify an accurate progress state of the cooking.

Therefore, there is a necessity to obtain a clearer and more accurate image and video of a food by providing a user notification to remove contamination by identifying a contamination level and contamination area of the camera lens installed in the cooking apparatus and the transparent window located between the camera and the food to protect the camera, or correcting an image and a video based on the information about the contamination level and contamination area.

Here, a type and level of contamination that may occur according to the type of food and cooking step of food may vary, and various contamination detection methods to detect the contamination by types and levels of each contamination may be introduced.

Accordingly, there is a necessity of identifying a way to adequately use a plurality of contamination detection methods to accurately identify the contamination level and contamination area of a camera lens or a transparent window located between the camera and food according to types of food and cooking steps of food.

SUMMARY

The disclosure relates to a cooking apparatus for determining the level of contamination and a contamination area of a camera lens or a transparent window located between a camera and a food to protect the camera based on each type and cooking steps of the food, and a control method thereof.

According to an aspect of the disclosure, there is provided a cooking apparatus including: an image capturer for obtaining an image of food located in the cooking apparatus; a memory configured to store instructions; and a processor configured to execute the instructions to cause the cooking apparatus to: obtain an image through the image capturer; obtain contamination level information according to a plurality of contamination detection techniques for detecting contamination of the image capturer based on the obtained image; identify a weight of the contamination level information based on at least one of a type of food or a cooking phase; obtain final contamination level information based on the contamination level information and the weight; and identify a contamination level of the image capturer based on the final contamination level information.

The plurality of contamination detection techniques may include at least one of a first contamination detection technique for detecting contamination of the image capturer based on a change in brightness gradient of adjacent pixels in the obtained image, a second contamination detection technique for detecting contamination of the image capturer based on a change in food contour on the obtained image, a third contamination detection technique for detecting contamination of the image capturer based on a change in pixel information of the obtained image, or a fourth contamination detection technique for detecting contamination of the image capturer by detecting reflection light of a lighting included in the cooking apparatus.

The image capturer may further include: a camera for capturing the image of the food; and a transparent protection window provided between the camera and the food and for protecting the camera from heat or a foreign substance generated by the cooking apparatus, wherein the fourth contamination detection technique may include a technique of emitting light generated by a lighting included in the cooking apparatus in a direction of the transparent protection window, and detecting contamination of the image capturer based on the reflection light reflected by the transparent protection window.

The first contamination detection technique may include a technique of identifying the contamination level of the image capturer to be high based on a reduction amount of the brightness gradient of an adjacent pixel in the obtained image increasing, and identifying the contamination level of the image capturer to be low based on the reduction amount of the brightness gradient of the adjacent pixel in the obtained image being small, wherein the second contamination detection technique may include a technique of identifying the contamination level of the image capturer to be high based on a sharpness of the food contour being degraded on the obtained image or the change in the pixel information corresponding to the contour increasing, and identifying the contamination level of the image capturer to be low based on the sharpness of the food contour being degraded on the obtained image or the pixel information change corresponding to the contour being small, wherein the third contamination detection technique may include a technique of identifying the contamination level of the image capturer to be high based on the change in the pixel information increasing in the obtained image, and identifying the contamination level of the image capturer to be low based on the change in the pixel information in the obtained image being small, and wherein the fourth contamination detection technique may include a technique of identifying the contamination level of the image capturer to be high based on the degree of scattering of the reflection light reflected by the transparent protection window being higher, and identifying the contamination level of the image capturer to be low based on the degree of scattering of the reflection light reflected by the transparent protection window being low.

The processor may be further configured to execute the instructions to cause the cooking apparatus to: identify the contamination level of the image capturer by areas based on the obtained image, and obtain the contamination level information by areas based on the identified contamination level by areas.

The processor may be further configured to execute the instructions to cause the cooking apparatus to, based on the type of the food being identified as a food including oil or seasoning, identify a weight in which a first weight corresponding to the first contamination detection technique and a third weight corresponding to the third contamination detection technique have a value greater than a second weight corresponding to the second contamination detection technique.

The processor may be further configured to execute the instructions to cause the cooking apparatus to, based on the type of the food being identified as a food where moisture is generated by a cooking operation of the cooking apparatus, identify a weight in which a second weight corresponding to the second contamination detection technique has a value greater than the first weight corresponding to the first contamination detection technique and the third weight corresponding to the third contamination detection technique.

The processor may be further configured to execute the instructions to cause the cooking apparatus to, based on the cooking phase being a cooking phase after continuously applying heat to the food for a threshold time or more, identify a weight where a second weight corresponding to the second contamination detection technique and a third weight corresponding to the third contamination detection technique have a value greater than a first weight corresponding to the first contamination detection technique.

The processor may be further configured to execute the instructions to cause the cooking apparatus to, based on the cooking phase being a phase before cooking or after cooking, identify a weight where a fourth weight corresponding to the fourth contamination detection technique has a value greater than a first weight corresponding to the first contamination detection technique, a second weight corresponding to the second contamination detection technique, and a third weight corresponding to the third contamination detection technique.

The processor may be further configured to execute the instructions to cause the cooking apparatus to, based on identifying that the identified contamination of the image capturer is greater than or equal to a threshold value, provide a user with information about the identified contamination of the image capturer.

According to an aspect of the disclosure, there is provided a method of controlling a cooking apparatus including an image capturer, the method including: obtaining an image through the image capturer; obtaining contamination level information according to a plurality of contamination detection techniques for detecting contamination of the image capturer based on the obtained image; identifying a weight of the contamination level information based on at least one of the type of food and a cooking phase; obtaining final contamination level information based on the contamination level information and the weight; and identifying a contamination level of the image capturer based on the final contamination level information.

The plurality of contamination detection techniques may include at least one of a first contamination detection technique for detecting contamination of the image capturer based on a change in brightness gradient of adjacent pixels in the obtained image, a second contamination detection technique for detecting contamination of the image capturer based on a change in food contour on the obtained image, a third contamination detection technique for detecting contamination of the image capturer based on a change in pixel information of the obtained image, or a fourth contamination detection technique for detecting contamination of the image capturer by detecting reflection light of a lighting included in the cooking apparatus.

The image capturer may include: a camera for capturing the food; and a transparent protection window located between the camera and the food and for protecting the camera from heat and a foreign substance generated by the cooking apparatus, wherein the fourth contamination detection technique may include a technique of emitting light generated by a lighting included in the cooking apparatus in a direction of the transparent protection window, and detecting contamination of the image capturer based on reflection light reflected by the transparent protection window.

The first contamination detection technique may include a technique of identifying the contamination level of the image capturer to be high based on a reduction amount of the brightness gradient of an adjacent pixel in the obtained image increasing, and identifying the contamination level of the image capturer to be low based on the reduction amount of the brightness gradient of the adjacent pixel in the obtained image being small, wherein the second contamination detection technique may include a technique of identifying the contamination level of the image capturer to be high based on a sharpness of the food contour being degraded on the obtained image or the change in the pixel information corresponding to the contour increasing, and identifying the contamination level of the image capturer to be low based on the sharpness of the food contour being degraded on the obtained image or the pixel information change corresponding to the contour being small, wherein the third contamination detection technique may include a technique of identifying the contamination level of the image capturer to be high based on the change in the pixel information increasing in the obtained image, and identifying the contamination level of the image capturer to be low based on the change in the pixel information in the obtained image being small, and wherein the fourth contamination detection technique may include a technique of identifying the contamination level of the image capturer to be high based on the degree of scattering of the reflection light reflected by the transparent protection window being higher, and identifying the contamination level of the image capturer to be low based on the degree of scattering of the reflection light reflected by the transparent protection window being low.

The obtaining the contamination level information may include: identifying the contamination level of the image capturer by areas based on the obtained image; and obtaining the contamination level information by areas based on the identified contamination level by areas.

In order to protect a camera lens or a camera according to types of food and each cooking step of food, a contamination level and a contamination area of a transparent window located between the camera and food may be determined.

Accordingly, a clear and accurate image and video of food may be obtained by providing a user notification to remove contamination or by correcting an image and a video based on the contamination level and information about the contamination area.

BRIEF DESCRIPTION OF THE DRAWINGS

FIG. 8 illustrates an example of a weight of the contamination level information by a plurality of contamination detection methods identified based on the type of food and cooking step according to various embodiments of the disclosure.

DETAILED DESCRIPTION

Figure 1:
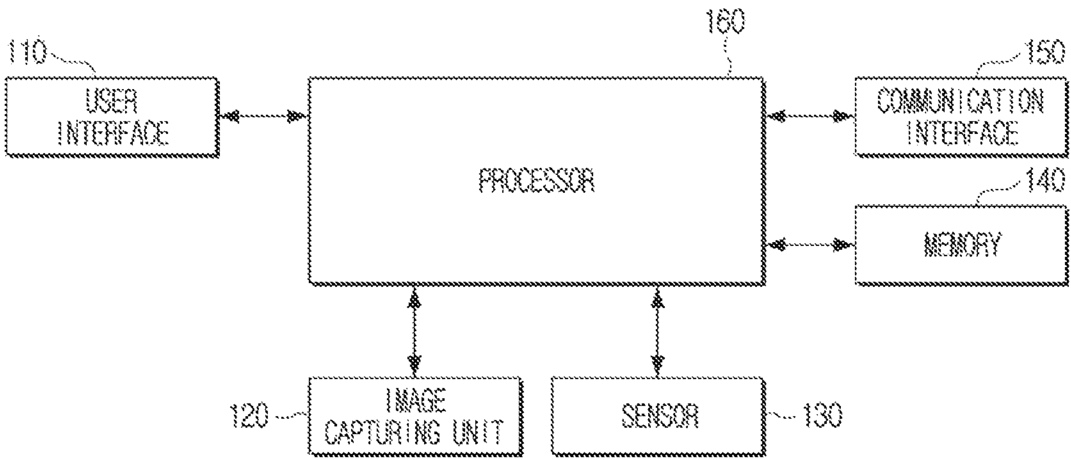
FIG. 1 is a block diagram illustrating a configuration of a cooking apparatus according to an embodiment of the disclosure.

The disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, a detailed description of known functions or configurations incorporated herein will be omitted as it may make the subject matter of the disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In this document, the expressions "have," "may have," "including," or "may include" may be used to denote the presence of a feature (e.g., a component, such as a numerical value, a function, an operation, a part, or the like), and does not exclude the presence of additional features.

The expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, will be used only in order to distinguish one component from the other components, and do not limit the corresponding components.

It is to be understood that an element (e.g., a first element) is "operatively or communicatively coupled with/to"

another element (e.g., a second element) is that any such element may be directly connected to the other element or may be connected via another element (e.g., a third element).

On the other hand, when an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of." The expression "configured to" does not necessarily mean "specifically designed to" in a hardware sense.

Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

The terms such as "module," "unit," "part", and so on are used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

The various elements and areas in the drawings are schematically drawn. Accordingly, the technical spirit of the disclosure is not limited by the relative size or spacing depicted in the accompanying drawings.

Hereinbelow, an embodiment according to the disclosure will be described in detail with reference to the accompanying drawings so as to be easily carried out by a person skilled in the art to which the disclosure belongs.

FIG. 1 is a block diagram illustrating a configuration of a cooking apparatus according to an embodiment of the disclosure.

A cooking apparatus 100 may be implemented with various apparatuses capable of performing a cooking operation of food like an oven, an air fryer, a microwave, an electric rice cooker, high pressure rice making pot, double-sided frying pan, a cooking apparatus for charcoal grill or the like. The cooking apparatus 100 according to various embodiments of the disclosure are not limited to the above device, and the cooking apparatus 100 may be implemented with the cooking apparatus 100 having two or more functions of the aforementioned devices.

In addition, the cooking apparatus 100 according to various embodiments of the disclosure may be connected to another external device and may perform one or more functions and may further include other various configurations necessary for a cooking operation, in addition to the configurations of FIG. 1.

The user interface 110 may include a button, a lever, a switch, a touch-type interface, or the like, and the touch-type interface may be implemented with a method of receiving an input by a user's touch on a display screen.

The cooking apparatus 100 according to various embodiments of the disclosure may receive a user command through the user interface 110 and perform a cooking operation.

The cooking apparatus 100 may provide a user with the contamination level information of the image capturing unit through the user interface 110, and may provide correction information of the obtained food image or video along with the obtained image or video of food.

The image capturing unit 120 may include a camera located within the cooking apparatus for capturing an indoor space where the food is located, and a transparent protection window located between the camera and food to protect the camera.

According to various embodiments of the disclosure, the camera may capture a still image and a moving image of food located within the cooking apparatus. The camera may include a capturing device, an image sensor, an image signal processor, a flash, and one or more lenses.

According to another embodiment of the disclosure, a camera may be composed of a plurality of cameras to obtain an image or a video of food at various angles. The plurality of cameras may be arranged on an upper surface, a side surface, and a lower surface inside the cooking apparatus, and may obtain a three-dimensional (3D) image or video of food through a plurality of cameras. The user or the processor 160 of the cooking apparatus 100 may identify a more accurate cooking progress by obtaining a 3D image or video of food.

In addition, the camera according to various embodiments of the disclosure may include a thermal imaging camera.

The transparent protection window may be disposed between the camera and food to avoid damage, contamination, or the like, of camera by heat or a foreign substance while a cooking operation is being performed.

The transparent protection window may be made of a synthetic resin, glass, or the like, and is not limited thereto and may be made of various materials having thermal resistance and durability, and through which visible rays, infrared rays, and ultraviolet rays may penetrate.

The image capturing unit 120 according to still another embodiment of the disclosure may be made of only a camera without including a transparent protection window.

In this case, a camera 120-1 and a lens (not shown) of a camera may be made of a material having heat resistance that may endure heat and durability against oil and moisture generated from the food 210.

The sensor 130 may detect an operation state (e.g., power or temperature) of the cooking apparatus 100 and external environment state, and may generate an electric signal or data corresponding to the detected state.

The sensor 130 according to various embodiments of the disclosure may include a pressure sensor, an infrared rays sensor, a temperature sensor, a humidity sensor, and an illuminance sensor.

The processor 160 of the cooking apparatus 100 may obtain information about the pressure inside the cooking apparatus through the pressure sensor, may obtain thermal image information inside the cooking apparatus through the infrared sensor, may obtain information about the temperature and humidity inside the cooking apparatus through the temperature sensor and the humidity sensor, and may obtain information about the intensity of light generated by the lighting arranged inside the cooking apparatus through an illuminance sensor.

The processor 160 of the cooking apparatus 100 may perform various cooking operations such as ending cooking, changing a cooking step, or the like, based on the information obtained by the sensor 130.

For example, the processor 160 of the cooking apparatus 100 may terminate the cooking or change the cooking step to the next cooking step when the threshold time elapses after the pressure, the temperature, or the humidity reaches a threshold value based on the information obtained through the sensor 130.

The memory 140 temporarily or non-temporarily stores various programs or data and transmits the stored information to the one or more processors 160 according to a call of the one or more processors 160. In addition, the memory 140 may store various types of information required for operations, processing, or control operations of the one or more processors 160 in an electronic format.

The memory 140 may include, for example, at least one of a main memory device and an auxiliary memory device. The main memory device may be implemented using a semiconductor storage medium such as a ROM and/or a RAM. The ROM may include, for example, a conventional ROM, an EPROM, an EEPROM, and/or a MASK-ROM. The RAM may include, for example, a DRAM and/or an SRAM. The auxiliary memory device may be implemented using at least one storage medium that may permanently or semi-permanently store data, such as a flash memory device, a secure digital (SD) card, a solid state drive (SSD), a hard disk drive (HDD), a magnetic drum, a compact disc (CD), a digital versatile disc (DVD) or an optical media like a laser disk, a magnetic tape, a magneto-optical disk, and/or a floppy disk.

The memory 140 according to various embodiments of the disclosure may store an image or a video of food obtained through the image capturing unit 120, and may store information about the type of food, a cooking method according to the type of food, and a cooking step. In addition, the memory 140 may store an algorithm for a plurality of contamination detection methods for detecting contamination of the image capturing unit, and may store containment level information of the image capturing unit obtained by a plurality of contamination detection methods. The memory 140 may store weight information of containment level information of the image capturing unit identified based on at least one of a type of food and a cooking step.

The communication interface 150 may include a wireless communication interface, a wired communication interface, or an input interface. The wireless communication interface may communicate with various external devices using wireless communication technology or mobile communication technology. The wireless communication method may include, for example, Bluetooth, Bluetooth low energy, CAN communication, Wi-Fi, Wi-Fi Direct, ultrawide band (UWB), ZigBee, Infrared Data Association (IrDA), or Near Field Communication (NFC), and the mobile communication technology may include 3GPP, Wi-Max, long term evolution (LTE), fifth generation (5G), but is not limited thereto. The wireless communication interface may be implemented by using an antenna that may transmit electromagnetic wave to the outside or receive electromagnetic wave transmitted from the outside, a communication chip, a substrate, or the like.

The wired communication interface may communicate with various external devices based on a wired communication network. The wired communication network may be implemented using, for example, a physical cable such as a pair cable, a coaxial cable, an optical fiber cable, or an Ethernet cable.

According to an embodiment, any one of the wireless communication and wired communication may be omitted. Therefore, the electronic device 100 may include only a wireless communication interface or wired communication interface. In addition, the cooking apparatus 100 may include an integrated communication interface that supports both wireless connection by the wireless communication interface and wired connection by wired communication interface.

Without limitation, the cooking apparatus 100 may include one communication interface 150 performing one type of communication connection and may include a plurality of communication interfaces 150.

The processor 160 according to various embodiments of the disclosure may communicate with a server or various external devices indoors or outdoors through the communication interface 150.

To be specific, the processor 160 may obtain information about the types of food, a cooking method according to the type of food, and cooking step stored in the external server.

The processor 160 of the cooking apparatus 100 according to still another embodiment of the disclosure may transmit the image or video of the food obtained through the image capturing unit 120 to the external server through the communication interface 150, and obtain information about the types of food, a cooking method according to the type of food, and cooking step stored in the external server. The processor 160 of the cooking apparatus 100 may transmit contamination level information of the image capturing unit 120 to or from the external server through the communication interface 150 and may obtain weight information stored in the external server.

The processor 160 of the cooking apparatus 100 according to still another embodiment of the disclosure may transmit the image or video of food obtained through the image capturing unit 120, and contamination level information of the image capturing unit 120 to the external device through the communication interface 150 for displaying the same.

The processor 160 controls overall operation of the cooking apparatus 100. To be specific, the processor 160 may be connected to the configuration of the cooking apparatus 100 including the memory 140 and by executing at least one instruction stored in the memory 140 as described above, may control overall operations of the cooking apparatus 100. In particular, the processor 160 may be implemented with one processor 160 and may be implemented with a plurality of processors 160.

The processor 160 may be implemented in various ways. For example, the processor 160 may be implemented with at least one of an application specific integrated circuit (ASIC), an embedded processor, a microprocessor, a hardware control logic, a hardware finite state machine (FSM), and a digital signal processor (DSP).

In the meantime, the processor 160 may include one or more among a central processor (CPU) for processing a digital signal, a micro controller unit (MCU), a micro processing unit (MPU), a controller, an application processor (AP), a communication processor (CP), an advanced reduced instruction set computing (RISC) machine (ARM) processor, or may be defined as a corresponding term. In addition, the processor 160 may be implemented in a system on chip (SoC) type or a large scale integration (LSI) type which a processing algorithm is built therein, or in a field programmable gate array (FPGA) type. The processor 160 may perform various functions by executing computer executable instructions stored in the memory 140. In addition, the processor 160 may include, in order to perform an artificial intelligence (AI) function, at least one of a graphics-processing unit (GPU), a neural processing unit (NPU), or a visual processing unit (VPU).

The specific control method of the processor 160 of the cooking apparatus 100 will be specifically described along with FIGS. 2 to 9.

The processor 160 according to an embodiment of the disclosure may obtain an image through the image capturing unit.

Figure 2:
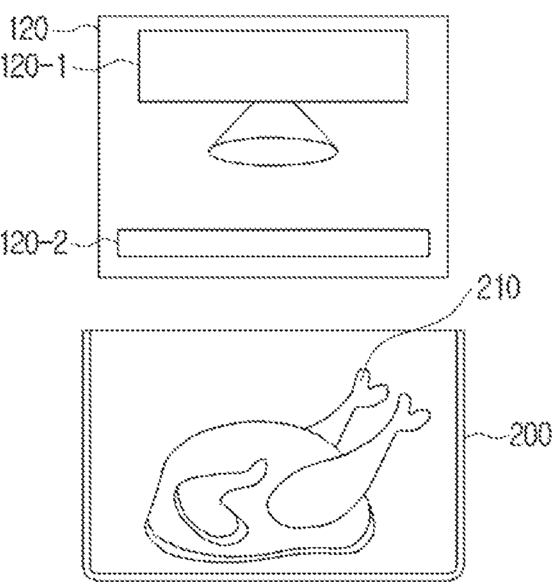
FIG. 2 illustrates an image capturing unit of a cooking apparatus and a cooking container in which food is contained, according to an embodiment of the disclosure.

FIG. 2 illustrates an image capturing unit of a cooking apparatus and a cooking container in which food is contained, according to an embodiment of the disclosure.

Referring to FIG. 2, the image capturing unit 120 may be made of the camera 120-1 and a transparent protection window 120-2 disposed between the camera 120-1 and a cooking space 200 containing the food 210 for cooking.

The transparent protection window 120-2 may have not only a planar shape but also a shape surrounding the camera 120-1 or the cooking space 200 containing the food 210.

In the meantime, the image capturing unit 120 does not necessarily include the transparent protection window 120-2 and may include only the camera 120-1.

While the food 210 is being cooked in the cooking space 200 inside the cooking apparatus, the processor 160 may obtain the image or video of the food through the image capturing unit 120.

The image capturing unit 120 according to various embodiments of the disclosure is not necessarily disposed above the food 210 and the cooking space 200, and may be disposed at side or below the food 210 and the cooking space 200.

The image capturing unit 120 is not necessarily limited to an example of including only one camera 120-1 and may include a plurality of cameras 120-1.

The food 210 may be diverse materials or food to be cooked by the cooking apparatus 100 such as chicken, beef, fish, bread, stew, or the like, and the processor 160 may cook the food 210 contained in the cooking space 200 by performing a cooking operation.

The cooking space 200 is a space included inside the cooking apparatus 100 where the food 210 may be located, and may have various shapes such as spherical, hemispherical, polyhedral shapes, or the like.

Figure 3:
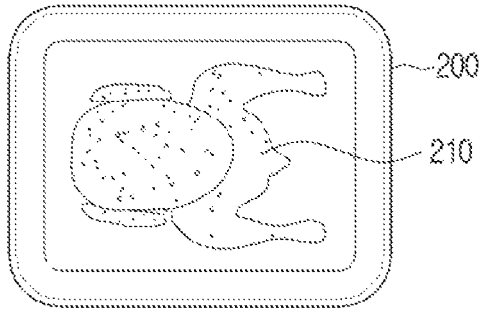
FIG. 3 is a diagram illustrates an image of food contained in a cooking container obtained by an image capturing unit, according to an embodiment of the disclosure.

FIG. 3 is a diagram illustrates an image of food contained in a cooking container obtained by an image capturing unit, according to an embodiment of the disclosure.

Referring to FIG. 3, the food 210 like chicken may be located in the cooking space 200, and the processor 160 may obtain accurate and clear image of the food 210 and the cooking space 200 like FIG. 3 in a state where the image capturing unit 120 is not stained with a foreign substance like oil, seasoning, moisture and is not contaminated.

Thereafter, when the cooking step is proceeded, foreign substances such as oil, seasoning, moisture, and the like may splatter from the food due to a cooking operation (for example, heating) of the cooking apparatus 100 so that the image capturing unit 120 may be contaminated, and an image of the food 210 contained in the cooking space 200 obtained by the processor 160 may be an image in which the sharpness of a partial area is degraded or is hidden by foreign substances.

At this time, the processor 160 may obtain the contamination level information of the image capturing unit 120 according to a plurality of contamination detection methods for detecting contamination of the image capturing unit 120 based on the obtained image.

Here, the processor 160 may obtain the contamination level information of the image capturing unit 120 according to a plurality of contamination detection methods based on a difference of pixel information between different areas on the obtained one image, and the embodiment is not limited thereto and may obtain the contamination level information of the image capturing unit 120 according to a plurality of contamination detection methods based on a change in pixel information about the same area among a plurality of obtained images.

Hereinbelow, a plurality of contamination detection methods for detecting contamination of the image capturing unit 120 will be described through FIGS. 4 to 7.

The first contamination detection may be performed through detection of a change in brightness gradient information 420 of adjacent pixels obtained based on a first image and a second image obtained at different time points.

Figure 4A:
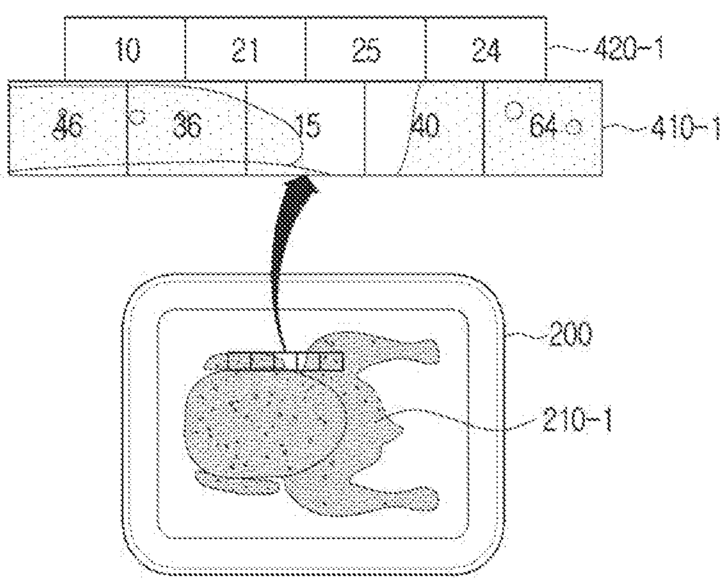
FIG. 4A illustrates a first contamination detection method for detecting contamination of an image capturing unit based on a change in a brightness gradient of an adjacent pixel in an obtained image among a plurality of contamination detection methods for detecting contamination of an image capturing unit, according to an embodiment of the disclosure.

FIG. 4A illustrates a first contamination detection method for detecting contamination of an image capturing unit based on a change in a brightness gradient of an adjacent pixel in an obtained image among a plurality of contamination detection methods for detecting contamination of an image capturing unit, according to an embodiment of the disclosure.

Referring to FIG. 4A, the processor 160 may obtain brightness information 410-1 of pixels of the food 210 contained in the cooking space 200 obtained by the image capturing unit 120 based on the first image. In addition, the processor 160 may obtain the brightness gradient information 420-1 indicating the difference of brightness value of adjacent pixels.

The information about pixels that the processor 160 may obtain is not limited to brightness information 410-1 of pixels and may include various pixel information like chroma, RGB information, or the like.

Figure 4B:
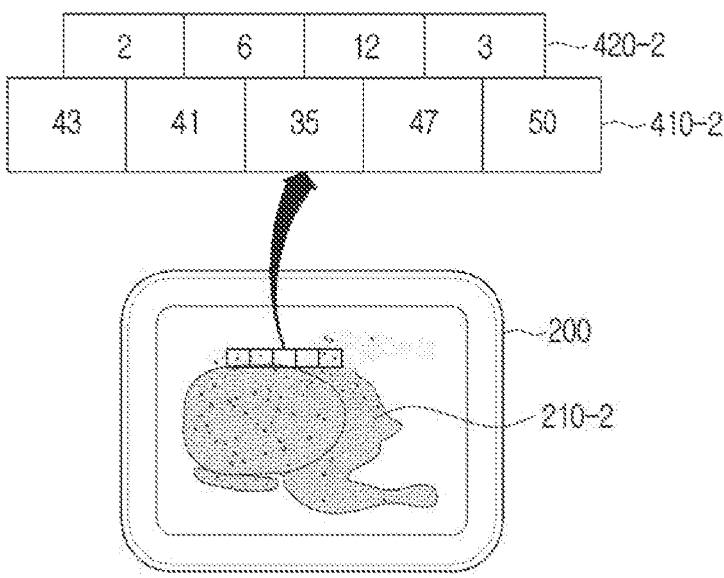
FIG. 4B illustrates a first contamination detection method for detecting contamination of an image capturing unit based on a change in a brightness gradient of an adjacent pixel in an obtained image among a plurality of contamination detection methods for detecting contamination of an image capturing unit, according to an embodiment of the disclosure.

FIG. 4B illustrates a first contamination detection method for detecting contamination of an image capturing unit based on a change in a brightness gradient of an adjacent pixel in an obtained image among a plurality of contamination detection methods for detecting contamination of an image capturing unit, according to an embodiment of the disclosure.

Referring to FIG. 4B, the second image of food 210 contained in the cooking space 200 obtained in a state in which the image capturing unit 120 is contaminated by splattering of oil included in the food to the image capturing unit 120 during cooking may include brightness information 410-2 of pixels different from pixel brightness information 410-1 of a first image obtained in a state in which the image capturing unit 120 is not contaminated. In addition, the processor 160 may obtain brightness gradient information 420-2 of adjacent pixels different from the brightness gradient information 420-1 of the adjacent pixels before the image capturing unit 120 is contaminated.

To be specific, when the image capturing unit 120 is contaminated with oil, an image of a portion corresponding to a contaminated area is obtained as a cloudy image, and the brightness difference of a pixel constituting an image corresponding to the contaminated area may be reduced. Therefore, the brightness gradient 420 of adjacent pixels may be reduced as compared to the gradient before contamination.

As described above, both the first image and the second image are obtained while the food 210 is located at the cooking space 200, but the embodiment is not limited thereto, and at least one of a plurality of images may be obtained while the food 210 is not located in the cooking space 200.

The processor 160 may calculate the contamination level of the image capturing unit to be high as a reduction amount of the brightness gradient 420 of an adjacent pixel in the obtained image increases, and calculate the contamination level of the image capturing unit to be low as the brightness gradient 420 reduction amount of the adjacent pixel in the obtained image is small.

Through the detection of change in brightness gradient of adjacent pixels, the processor 160 may obtain the contamination level information of the image capturing unit 120.

Also, when only a partial area of the image capturing unit 120 is contaminated with a foreign material such as oil, the processor 160 may obtain information about a contamination area of the image capturing unit 120 through a brightness gradient change detection method for partial adjacent pixels of the image obtained through the image capturing unit 120. That is, the processor 160 may calculate the contamination level of the image capturing unit 120 for each area based on the obtained first image and second image, and may obtain containment level information for each area of the image capturing unit 120 based on the calculated contamination level for each area.

The second contamination detection method may be performed through the contour image change detection obtained based on a first image and a second image obtained at different time points.

Figure 5A:
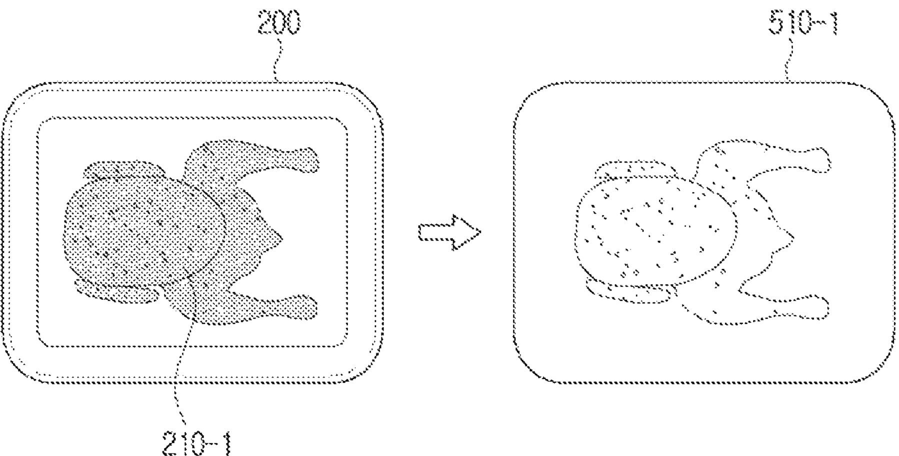
FIG. 5A illustrates a second contamination detection method for detecting contamination of an image capturing unit based on a food contour change on an obtained image among a plurality of contamination detection methods for detecting contamination of an image capturing unit, and illustrates a first image obtained in a state where the capturing unit is not contaminated, according to an embodiment of the disclosure.

FIG. 5A illustrates a second contamination detection method for detecting contamination of an image capturing unit based on a food contour change on an obtained image among a plurality of contamination detection methods for detecting contamination of an image capturing unit, and illustrates a first image obtained in a state where the capturing unit is not contaminated, according to an embodiment of the disclosure.

Referring to FIG. 5A, the processor 160 may extract the contour of the food 210 from the first image of the food 210 contained in the cooking space 200 obtained through the image capturing unit 120, and may obtain a first contour image 510-1 to which the extracted contour is reflected.

In the first contour image 510-1 obtained in a state where the image capturing unit 120 is not contaminated, all the contours of the food may be clearly displayed.

Figure 5B:
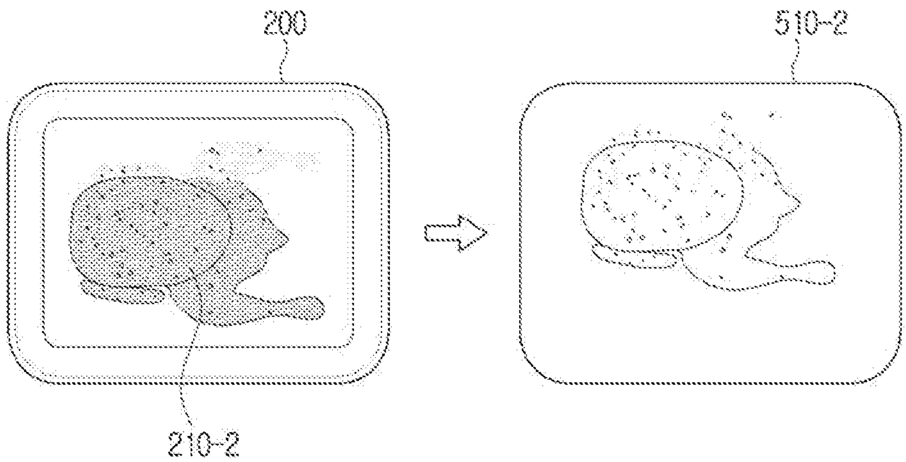
FIG. 5B illustrates a second contamination detection method for detecting contamination of an image capturing unit based on a food contour change on an obtained image among a plurality of contamination detection methods for detecting contamination of an image capturing unit, and illustrates a second image obtained in a state where the image capturing unit is contaminated, according to an embodiment of the disclosure.

FIG. 5B illustrates a second contamination detection method for detecting contamination of an image capturing unit based on a food contour change on an obtained image among a plurality of contamination detection methods for detecting contamination of an image capturing unit, and illustrates a second image obtained in a state where the image capturing unit is contaminated, according to an embodiment of the disclosure.

Referring to FIG. 5B, when foreign substances such as oil and moisture splatter to a partial area of the image capturing unit 120 and a partial area of the image capturing unit 120 is contaminated, the processor 160 may obtain a second image in which a partial area becomes cloudy through the image capturing unit 120. The processor 160 may obtain a second contour image 510-2 consisting of a contour of the food 210 extracted from the cloudy image.

The processor 160 may calculate the contamination level of the image capturing unit 120 to be high as a sharpness of the contour of the food 210 is degraded on the obtained image or the change in the pixel information corresponding to the contour increases, and calculate the contamination level of the image capturing unit 120 to be low as the sharpness of the contour of the food 210 is degraded on the obtained image or the pixel information change corresponding to the contour is small.

Here, the pixel information change corresponding to the contour may include information about a change in the total amount, width, and length.

Figure 5C:
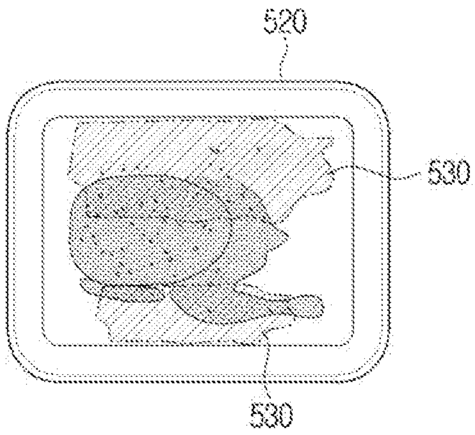
FIG. 5C illustrates a second contamination detection method for detecting contamination of an image capturing unit based on a food contour change on an obtained image among a plurality of contamination detection methods for detecting contamination of an image capturing unit, and illustrates a contamination area of the image capturing unit from the obtained image, according to an embodiment of the disclosure.

FIG. 5C illustrates a second contamination detection method for detecting contamination of an image capturing unit based on a food contour change on an obtained image among a plurality of contamination detection methods for detecting contamination of an image capturing unit, and illustrates a contamination area of the image capturing unit from the obtained image, according to an embodiment of the disclosure.

Referring to FIG. 5C, a contour corresponding to a partial area 530 of a second contour image 510-2 obtained in a state where a partial area of the image capturing unit 120 is contaminated may be faintly displayed, and when the contamination level of the corresponding area 530 is high, a contour may be invisible. Accordingly, the processor 160 may identify that the area of the image capturing unit 120 corresponding to an area 530 in which the contour of the food 210 does not appear clearly is contaminated. Therefore, the processor 160 may obtain the second contour image 510-2 by extracting the contour from the obtained second image, and may calculate the contamination level of the image capturing unit 120 for each area based on the obtained second contour image 510-2. The processor 160 may obtain contamination level information for each area of the image capturing unit 120 based on the finally calculated contamination level for each area.

The third contamination detection method may be made through local pixel information change detection obtained based on the first image and the second image obtained at different time points.

Figure 6A:
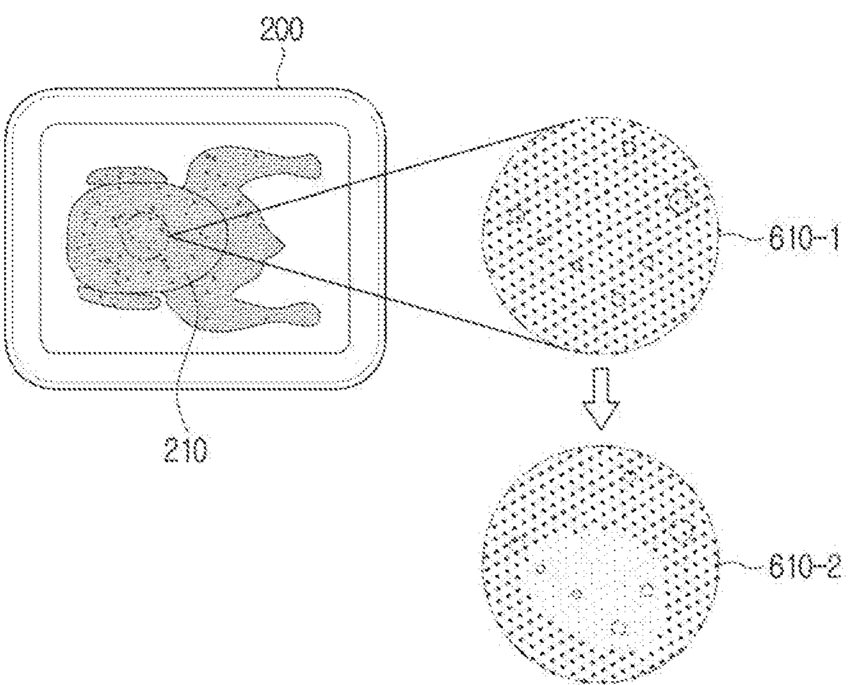
FIG. 6A illustrates a third contamination detection method for detecting contamination of the image capturing unit based on local pixel information change of an image obtained among a plurality of contamination detection methods for detecting contamination of the image capturing unit.

FIG. 6A illustrates a third contamination detection method for detecting contamination of the image capturing unit based on local pixel information change of an image obtained among a plurality of contamination detection methods for detecting contamination of the image capturing unit.

Referring to FIG. 6A, while the food 210 contained in the cooking space 200 is being cooked, a partial area of the image capturing unit 120 may be contaminated by oil, seasoning, or the like, included in the food 210 splattering to the image capturing unit 120, and a second image 610-2 in a state in which a partial area of the food 210 is cloudy may be obtained. The processor 160 may obtain information about the contamination level and the contamination area of the image capturing unit 120 by comparing the image 610-1 of the food 210 before the contamination with the first image 610-1 of the food 210 after the contamination.

Figure 6B:
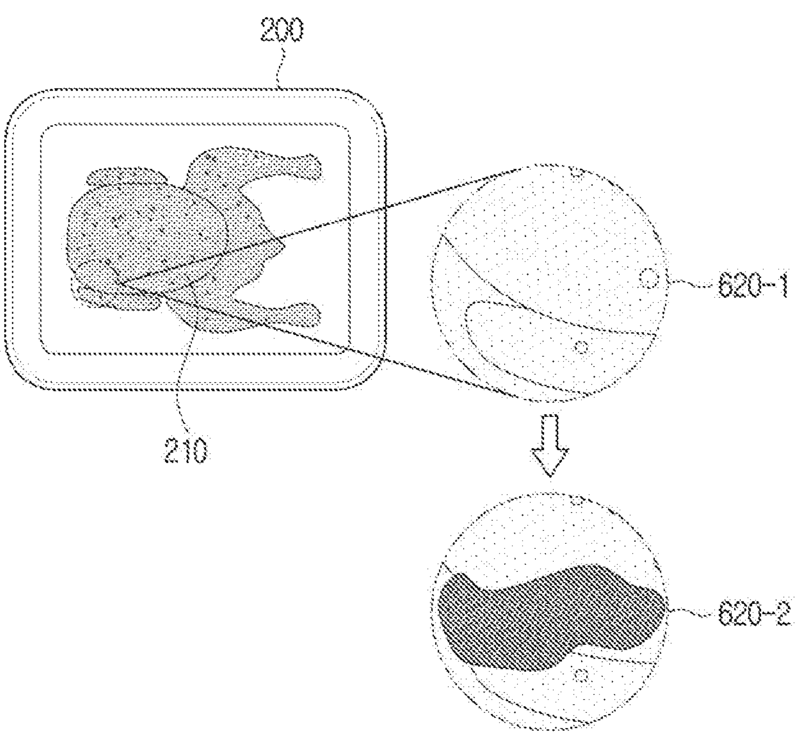
FIG. 6B illustrates a third contamination detection method for detecting contamination of the image capturing unit based on local pixel information change of an image obtained among a plurality of contamination detection methods for detecting contamination of the image capturing unit.

FIG. 6B illustrates a third contamination detection method for detecting contamination of the image capturing unit based on local pixel information change of an image obtained among a plurality of contamination detection methods for detecting contamination of the image capturing unit.

Referring to FIG. 6B, while the food 210 contained in the cooking space 200 is being cooked, small particles such as small pepper grains stained on the surface of the food 210 may splatter to the image capturing unit 120 so that a partial area of the image capturing unit 120 may be contaminated, and a second image 610-2 in a state in which a partial area of the food 210 is hidden by particles splattered on the image capturing unit 120 may be obtained. The processor 160 may obtain information about the contamination level of the image capturing unit 120 by comparing the first image 620-1 of the food 210 before the contamination with the second image 620-2 of the food 210 after the contamination.

The processor 160 may obtain information about the contamination level of the image capturing unit 120 based on changes in local pixel information of the images 610-1, 620-1 of the food 210 before contamination and the images 620-1, 620-2 of the food 210 after the contamination.

The plurality of images obtained at different time points, such as the first image and the second image, may be obtained while the food 210 is located in the cooking space 200, but the embodiment is not limited thereto, and at least one of the plurality of images may be obtained while the food 210 is not located in the cooking space 200.

To be specific, the processor 160 may calculate the contamination level of the image capturing unit 120 to be high as the change in the local pixel information increases in the obtained image while the food 210 is located in the cooking apparatus 100, and may calculate the contamination level of the image capturing unit 120 to be low as the change in the local pixel information in the obtained image is small.

In addition, the processor 160 may calculate the contamination level of the image capturing unit 120 by areas based on the local pixel information change of the first images 610-1, 620-1 of the food 210 before contamination and the second images 620-1, 620-2 of the food 210 after contamination, and may obtain the contamination level information by areas of the image capturing unit 120 based on the calculated contamination level by areas.

The fourth contamination detection method may be performed through detection of a change in a degree of scattering of reflection light obtained based on the first image and the second image obtained at different time points. In the meantime, the fourth contamination detection method is not limited thereto, and the contamination of the image capturing unit 120 may be detected through a preset value of the obtained degree of scattering of the reflection light and a degree of scattering of reflection light obtained based on one image.

Figure 7A:
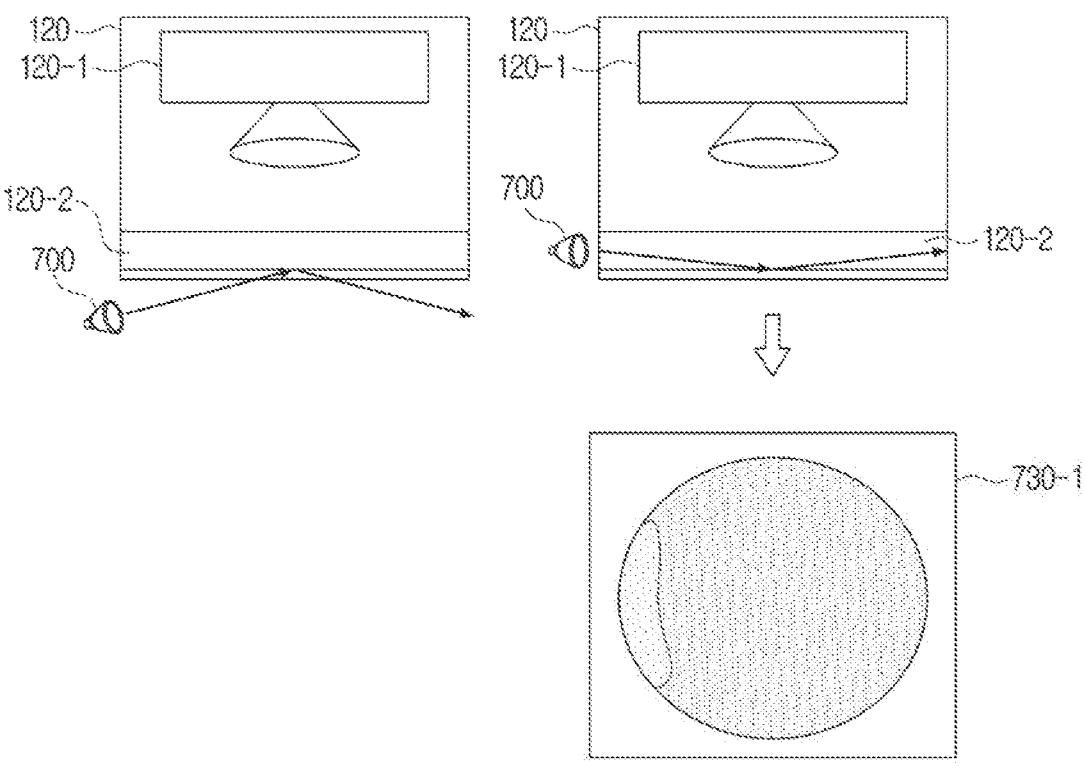
FIG. 7A illustrates a fourth contamination detection method of detecting contamination of the image capturing unit by detecting reflection light of the lighting included in the cooking apparatus among a plurality of contamination detection methods for detecting contamination of the image capturing unit, and illustrates a first image obtained in a state where the image capturing unit is not contaminated, according to an embodiment.

FIG. 7A illustrates a fourth contamination detection method of detecting contamination of the image capturing unit by detecting reflection light of the lighting included in the cooking apparatus among a plurality of contamination detection methods for detecting contamination of the image capturing unit, and illustrates a first image obtained in a state where the image capturing unit is not contaminated, according to an embodiment.

Referring to FIG. 7A, the cooking apparatus 100 may include a lighting 700 inside, and the processor 160 may control the lighting 700 to emit light occurring by the lighting 700 included inside the cooking apparatus 100 in a direction of the transparent protection window 120-2. As illustrated in FIG. 7A, the lighting 700 may be located at an opposite side of the camera 120-1 with the transparent protection window 120-2 therebetween, and may be located at the same plane as the transparent protection window 120-2. The embodiment is not limited thereto, and the lighting 700 may be located between the camera 120-1 and the transparent protection window 120-2.

The lighting 700 may be composed of a plurality of lightings 700, and when the cooking apparatus 100 includes a plurality of lightings 700, and the processor 160 may control the lighting 700 so that different lightings 700 may alternately emit light in the direction of the transparent protection window 120-2.

Here, the processor 160 may control the direction or angle of the lighting 700 so that light emitted by the lighting 700 may be incident on the transparent protection window 120-2 at various angles.

The processor 160 may obtain a first image 730-1 on which the reflection light reflected by the transparent protection window 120-2 is displayed. Here, when the transparent protection window 120-2 is not contaminated, the light emitted by the lighting 700 may be totally reflected by the transparent protection window 120-2, and the processor 160 may obtain the first image 730-1 in a totally reflected state.

Figure 7B:
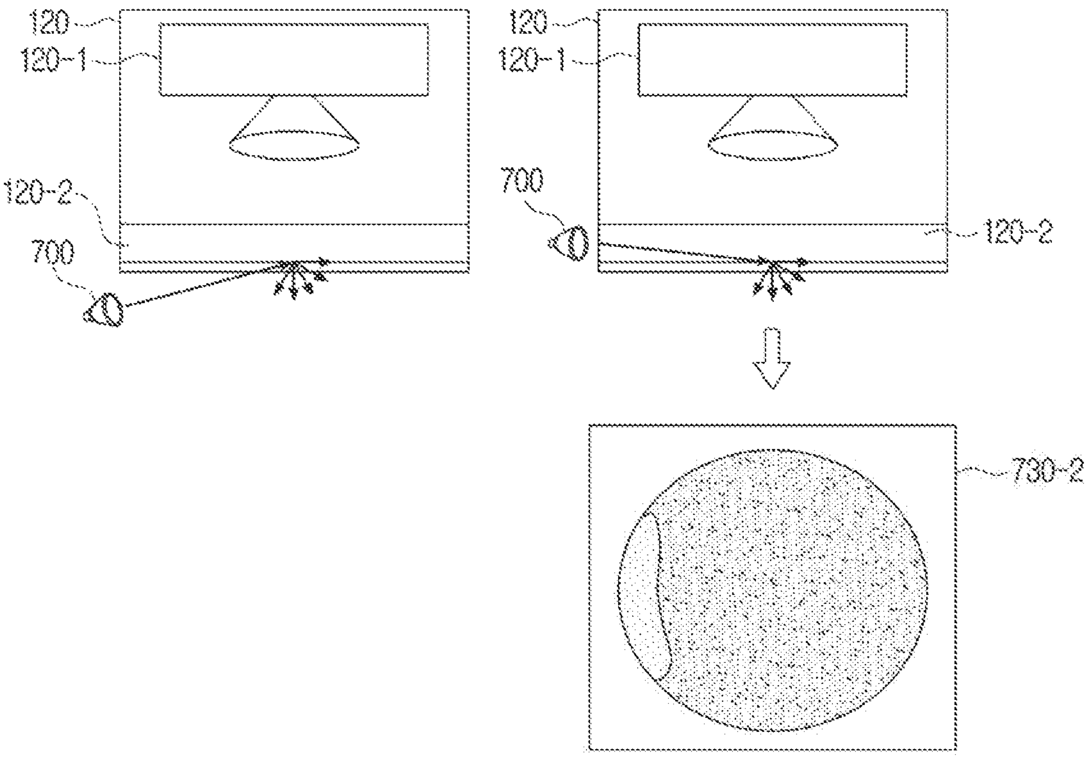
FIG. 7B illustrates a fourth contamination detection method of detecting contamination of the image capturing unit by detecting reflection light of the lighting included in the cooking apparatus among a plurality of contamination detection methods for detecting contamination of the image capturing unit, and illustrates a second image obtained in a state where the image capturing unit is contaminated, according to an embodiment.

FIG. 7B illustrates a fourth contamination detection method of detecting contamination of the image capturing unit by detecting reflection light of the lighting included in the cooking apparatus among a plurality of contamination detection methods for detecting contamination of the image capturing unit, and illustrates a second image obtained in a state where the image capturing unit is contaminated, according to an embodiment.

Referring to FIG. 7B, if a foreign substance like oil, seasoning, grain, or the like, splatters onto the transparent protection window 120-2 and the window is contaminated, light emitted by the lighting 700 may be scattered by a foreign substance splattered on a surface of the transparent protection window 120-2. Therefore, the processor 160 may obtain the second image 730-2 in a state where the light of the lighting 700 emitted in the direction of the transparent protection window 120-2 is scattered.

The processor 160 may obtain information about the scattering degree of the reflection light by comparing a first image 730-1 in a state in which light is totally reflected by the transparent protection window 120-2 and a second image 730-2 in a state in which light is partially scattered on the surface of the transparent protection window 120-2. The processor 160 may calculate the contamination level of the image capturing unit 120 to be high as the degree of scattering of the reflection light reflected by the transparent protection window 120-2 is higher, and calculate the contamination level of the image capturing unit 120 to be low as the degree of scattering of the reflection light reflected by the transparent protection window 120-2 is low.

Here, the processor 160 may obtain information about the degree of scattering of the obtained reflection light based only on a preset value about the obtained degree of scattering of reflection light and the second image, and may calculate the contamination level of the image capturing unit 120.

In addition, the processor 160 may calculate the contamination level of a partial area, corresponding to the area where the degree of scattering of the reflection light is high, of the image capturing unit 120 to be high, and may calculate the contamination level of a partial area, corresponding to the area where the degree of scattering of the reflection light is low, of the image capturing unit 120 to be low.

Accordingly, the processor 160 may calculate the contamination level of the image capturing unit 120 for each area based on the information about the scattering degree of the reflection light obtained by comparing an image 730-1 in a state in which light is totally reflected by the transparent protection window 120-2 and an image 730-2 in a state in which light is partially scattered from the surface of the transparent protection window 120-2, and may obtain containment level information for each area of the image capturing unit 120 based on the calculated contamination level for each area.

All the plurality of images obtained at different time points may be obtained while the food 210 is located in the cooking space 200, but the embodiment is not limited thereto and at least one of the plurality of images may be obtained while the food 210 is not located in the cooking space 200.

The processor 160 may obtain the final contamination level information by identifying the weight of the contamination level information obtained according to the first to fourth contamination detection methods.

Here, the processor 160 may identify the weight of the contamination level information obtained according to the first to fourth contamination detection methods based on at least one of the type and cooking step of the food.

Specifically, the processor 160 according to an embodiment of the disclosure may identify the type of the food 210 by inputting the obtained image of the food 210 into a first neural network model (e.g., a food type determination model) stored in the memory 140 or an external server, or may identify the type of the food 210 by receiving a user command through the user interface 110. The type of food 210 may be identified as not only the type of food to be cooked (for example, fried food, grilled food, steamed food, stew), but also the name of food (for example, chicken, grilled fish, salmon steak, braised pollack, rich soybean paste stew, and bread). When the type of the food 210 is identified as the type of food or the name of food, the processor 160 may identify information about the nature of food (e.g., including oil and seasoning, and moisture generation during cooking) corresponding to the identified type of food or the name of the food.

The processor 160 may obtain, from the memory 140 or the external server, information about an entire cooking step (e.g., a pre-cooking step, a first cooking step, a second cooking step, and the like) corresponding to the identified type of the food 210. In addition, the processor 160 may obtain information about pressure, temperature, or humidity based on the information obtained through the sensor 130, and may identify the current cooking step based on at least one of the information about the pressure, the temperature, or the humidity. For example, when the temperature of the cooking space 200 inside the cooking apparatus 100 rises by a threshold value or higher for a preset time through the temperature sensor 130, the processor 160 may identify the cooking step in the rapid heating step.

As described above, the processor 160 may identify the type and cooking step of the food 210, and may identify the weight of the contamination level information obtained according to the image capturing unit contamination detection method based on at least one of the identified type or cooking step of the food 210.

FIG. 8 illustrates an example of a weight of the contamination level information by a plurality of contamination detection methods identified based on the type of food and cooking step according to various embodiments of the disclosure.

The processor 160 may obtain the final contamination level information with respect to the image capturing unit 120 by differentiating the weight of the contamination level information obtained according to first to fourth contamination detection methods to detect contamination of the image capturing unit 120 based on a type 810 and cooking steps 820-1, 820-2, 820-3, 820-4 of the food.

Here, the weight of the contamination level information obtained according to a first contamination detection method may be indicated as a first weight 830-1, the weight of the contamination level information obtained according to a second contamination detection method may be indicated as a second weight 830-2, the weight of the contamination level information obtained according to a third contamination detection method may be indicated as a third weight 830-3, and the weight of the contamination level information obtained according to a fourth contamination detection method may be indicated as a fourth weight 830-4.

For example, referring to FIG. 8, when the food type 810 is chicken 210 and the currently performed cooking step is a cooking step 1, the processor 160 may obtain final containment level information of the image capturing unit 120 by identifying that a first weight of containment level information corresponding to a first contamination detection method is 1, a second weight of contamination level information corresponding to a second contamination detection method is 1, a third weight of contamination level information corresponding to a third contamination detection method is 1.5, and a fourth weight of contamination level information corresponding to a fourth contamination detection method is 0.5.

Hereinbelow, based on the type 810 and the cooking step 820 of the food, how the weight obtained by first to fourth contamination detection methods may be identified will be described and the weight information table as illustrated in FIG. 8 will be described.

According to an embodiment of the disclosure, the processor 160 may, when the type of the food 210 is identified as the food 210 including oil or seasoning, identify a weight having a value greater than a first weight corresponding to a first contamination detection method and a second weight corresponding to the second contamination detection method.

Specifically, the food 210 containing oil or seasoning may cover the local part of the image capturing unit 120, since oil or seasoning may splatter to the image capturing unit 120, and may identify a weight of contamination level information obtained according to a method for detecting a brightness gradient change of an adjacent pixel, which is a first contamination detection method suitable for detecting a local contamination of the image capturing unit 120, and a weight of contamination level information obtained according to a local pixel information change detection method, which is a third contamination detection method, higher than the weight of contamination level information obtained according to another contamination detection method. The processor 160 may store information about the identified weight in the memory 140 or an external server for each of the food type 810 and the cooking step 820 in the form as shown in FIG. 8.

According to another embodiment of the disclosure, when the type of food is identified as the food 210 in which moisture is generated by a cooking operation of the cooking apparatus 100, the processor 160 may identify a weight having a value greater than a first weight corresponding to a first contamination detection method and a third weight corresponding to a third contamination detection method.

Specifically, the food 210, in which moisture is generated during a cooking process by a cooking operation of the cooking apparatus 100, may cover a wide part of the image capturing unit 120, and may identify a weight of contamination level information obtained according to a food contour change detection method, which is a second contamination detection method, to be higher than a weight of contamination level information obtained according to another contamination detection method in order to detect the wide range of contamination of the image capturing unit 120. The processor 160 may store information about the identified weight in the memory 140 or an external server for each of the food type 810 and the cooking step 820 in the form as illustrated in FIG. 8.

According to another embodiment of the disclosure, when the cooking step is a cooking step after a continuous heating step of continuously applying heat to the food 210 for a threshold time or more, the processor 160 may identify a weight where a second weight corresponding to the second contamination detection method and a third weight corresponding to the third contamination detection method have a value greater than the first weight corresponding to the first contamination detection method.

Specifically, if heat is continuously applied to the food 210 by the cooking apparatus 100, in order to accurately detect contamination of the image capturing unit 120 by moisture generated from the food 210 and seasoning, grain particles, etc. that may splatter when the food reaches a threshold temperature or higher after the middle of heating, the weight of the contamination level information obtained according to the food contour change detection method, which is the second contamination detection method, and local pixel information change detection method, which is the third contamination detection method, may be identified higher than the weight of the contamination level information obtained according to other contamination detection methods, so that both wide-range contamination of the image capturing unit 120 and contamination of a minute local area of the image capturing unit 120 may be detected. The processor 160 may store the identified weight information in the memory 140 or an external server for each food type 810 and cooking step 820 in the form shown in FIG. 8.

According to another embodiment of the disclosure, the processor 160 may, when the cooking step is a step before cooking or after cooking, identify a weight in which a fourth weight corresponding to a fourth contamination detection method has a value greater than the first weight corresponding to a first contamination detection method, a second weight corresponding to a second contamination detection method, and a third weight corresponding to a third contamination detection method.

Specifically, a method for detecting reflection light of the lighting 700, which is a fourth contamination detection method, may detect contamination of the image capturing unit 120 due to foreign substances generated from the food 210, as well as contamination of the image capturing unit 120 before and after cooking, through active control of the lighting 700 after cooking starts. In particular, the fourth contamination detection method may detect very minute contamination and contamination throughout the image capturing unit 120 and thus, minute contamination of the image capturing unit 120 at a relatively clean state before starting cooking may be detected. The processor 160 may store information about the identified weight in the memory 140 or an external server for each of the food type 810 and the cooking step 820 in the form of FIG. 8.

The processor 160 may obtain the final containment level information of the image capturing unit 120 based on the contamination level information of image capturing unit 120 and the weight of contamination level information obtained according to each of the first to fourth contamination detection methods as described above.

The processor 160 may determine contamination of the image capturing unit 120 based on the obtained final contamination level information of the image capturing unit 120, and the processor 160 may, based on identifying that the determined contamination of the image capturing unit 120 is greater than or equal to a threshold value, may provide a user with determined information about the image capturing unit 120.

Here, the processor 160 may obtain information about the contamination of the image capturing unit 120 by inputting information about a final contamination level to a second neural network model (e.g., an image capturing unit contamination determination model) stored in the memory 140 or an external server, and may obtain information about whether the contamination of the image capturing unit 120 is equal to or greater than a threshold value.

The processor 160 may notify a user with whether the image capturing unit 120 is contaminated through a notification sound, and may provide information about contamination by areas and contamination level of the image capturing unit 120 through a display (not shown).

Also, the processor 160 may transmit, to an external device or a user terminal device, information about contamination per area and information about the level of contamination through the communication interface 150, and may control the external device and the user terminal device so that the information about the contamination and contamination level for each area of the image capturing unit 120 is provided to the user in the corresponding external device or the user terminal device.

Figure 9:
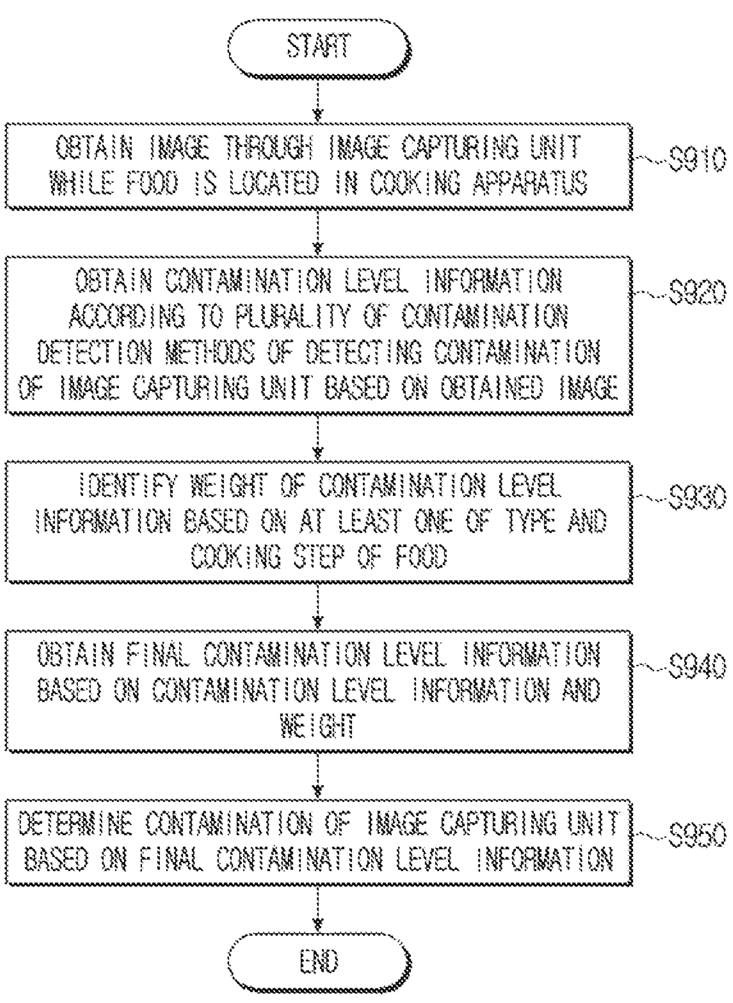
FIG. 9 is a flowchart illustrating an operation of an electronic apparatus according to various embodiments of the disclosure.

FIG. 9 is a flowchart illustrating an operation of an electronic apparatus according to various embodiments of the disclosure.

The cooking apparatus 100 according to various embodiments of the disclosure may obtain an image through the image capturing unit 120 while the food 210 is located in the cooking apparatus 100 in operation S910. In this example, the obtained image may be an image of the food 210 viewed from various angles and locations through a plurality of image capturing units 120 as well as an image of viewing the food 210 from the upper side, and may be the food 210 image or video of a three-dimensional (3D) form.

The cooking apparatus 100 may obtain the contamination level information according to a plurality of contamination detection methods of detecting contamination of the image capturing unit 120 based on the obtained image in operation S920. Here, the plurality of contamination detection methods may include a first contamination detection method of detecting contamination of the image capturing unit based on a change in brightness gradient of adjacent pixels in an obtained image, a second contamination detection method of detecting contamination of the image capturing unit based on a change in food contour on the obtained image, a third contamination detection method of detecting contamination of the image capturing unit based on the local pixel information change of the obtained image, and a fourth contamination detection method of detecting contamination of the image capturing unit by detecting the reflection light of the lighting included in the cooking apparatus. In addition, the cooking apparatus 100 may calculate a contamination level by areas based on the obtained image, and may obtain the contamination level information by areas of the image capturing unit 120 based on contamination level by areas.

The cooking apparatus 100 may identify the weight of the contamination level information based on at least one of the type and cooking step of the food in operation S930. According to whether the food includes oil and seasoning, whether moisture is generated during a cooking process, the weights of the contamination level information obtained according to first to fourth contamination detection methods may have different weights.

The cooking apparatus 100 may obtain the final contamination level information based on the contamination level information and the weight in operation S940.

The cooking apparatus 100 may determine contamination of the image capturing unit 120 based on the final contamination level information in operation S950.

According to one embodiment, a method according to various embodiments disclosed herein may be provided in a computer program product. A computer program product may be traded between a seller and a purchaser as a commodity. A computer program product may be distributed in the form of a machine readable storage medium (e.g., compact disc read only memory (CD-ROM)) or distributed online through an application store (e.g., PlayStore™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

The foregoing example embodiments are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A cooking apparatus comprising:

an image capturer for obtaining an image of food located in the cooking apparatus;

a memory configured to store instructions; and a processor configured to execute the instructions to cause the cooking apparatus to:

obtain an image through the image capturer;

obtain contamination level information according to a plurality of contamination detection techniques for detecting contamination of the image capturer based on the obtained image;

identify a first weight corresponding to a first contamination detection technique, among the plurality of contamination detection techniques, of first contamination level information obtained according to the first contamination detection technique based on at least one of a type of food or a cooking phase;

identify a second weight corresponding to a second contamination detection technique, among the plurality of contamination detection techniques, of second contamination level information obtained according to the second contamination detection technique based on at least one of the type of food or the cooking phase; and obtain final contamination level information based on the first contamination level information, the second contamination level information, the first weight, and the second weight.

2. The cooking apparatus of claim 1, wherein the plurality of contamination detection techniques comprise at least one of:

the first contamination detection technique for detecting contamination of the image capturer based on a change in brightness gradient of adjacent pixels in the obtained image, the second contamination detection technique for detecting contamination of the image capturer based on a change in food contour on the obtained image, a third contamination detection technique for detecting contamination of the image capturer based on a change in pixel information of the obtained image, or a fourth contamination detection technique for detecting contamination of the image capturer by detecting reflection light of a lighting included in the cooking apparatus.

3. The cooking apparatus of claim 2, wherein the image capturer comprises:

a camera for capturing the image of the food; and a transparent protection window provided between the camera and the food and for protecting the camera from heat or a foreign substance generated by the cooking apparatus, wherein the plurality of contamination detection techniques comprise the fourth contamination detection technique, and the fourth contamination detection technique comprises:

a technique of emitting light generated by a lighting included in the cooking apparatus in a direction of the transparent protection window, and detecting contamination of the image capturer based on the reflection light reflected by the transparent protection window.

4. The cooking apparatus of claim 1, wherein the plurality of contamination detection techniques further comprise a (i) contamination detection technique, a (ii) contamination detection technique, a (iii) contamination detection technique, and fourth (iv) contamination detection technique, wherein the (i) contamination detection technique comprises:

identifying a contamination level of the image capturer to be low based on a reduction amount of a brightness gradient of an adjacent pixel in the obtained image being small, wherein the (ii) contamination detection technique comprises:

a technique of identifying the contamination level of the image capturer to be high based on a sharpness of the food contour being degraded on the obtained image or the change in pixel information corresponding to the contour increasing, and identifying the contamination level of the image capturer to be low based on the sharpness of the food contour being degraded on the obtained image or the pixel information change corresponding to the food contour being small, wherein the (iii) contamination detection technique comprises:

a technique of identifying the contamination level of the image capturer to be high based on the change in the pixel information increasing in the obtained image, and identifying the contamination level of the image capturer to be low based on the change in the pixel information in the obtained image being small, and wherein the (iv) contamination detection technique comprises:

a technique of identifying the contamination level of the image capturer to be high based on a degree of scattering of a reflection light reflected by a transparent protection window being higher, and identifying the contamination level of the image capturer to be low based on the degree of scattering of the reflection light reflected by the transparent protection window being low, wherein the first contamination detection technique is one of (i), (ii), (iii), and (iv) contamination detection techniques, and the second contamination detection technique is another one of (i), (ii), (iii), and (iv) contamination detection techniques.

5. The cooking apparatus of claim 4, wherein the processor is further configured to execute the instructions to cause the cooking apparatus to:

identify the contamination level of the image capturer by areas based on the obtained image, and obtain the final contamination level information by areas based on the identified contamination level by areas.

6. The cooking apparatus of claim 4, wherein the processor is further configured to execute the instructions to cause the cooking apparatus to, based on the type of the food being identified as a food including oil or seasoning, identify a weight in which a third weight corresponding to the (i) contamination detection technique and a fifth weight corresponding to the (iii) contamination detection technique have a value greater than a fourth weight corresponding to the (ii) contamination detection technique.

7. The cooking apparatus of claim 4, wherein the processor is further configured to execute the instructions to cause the cooking apparatus to, based on the type of the food being identified as a food where moisture is generated by a cooking operation of the cooking apparatus, identify a weight in which a fourth weight corresponding to the (ii) contamination detection technique has a value greater than a third weight corresponding to the (i) contamination detection technique and a fifth weight corresponding to the (iii) contamination detection technique.

8. The cooking apparatus of claim 4, wherein the processor is further configured to execute the instructions to cause the cooking apparatus to, based on the cooking phase being a cooking phase after continuously applying heat to the food for a threshold time or more, identify a weight where a fourth weight corresponding to the (ii) contamination detection technique and a fifth weight corresponding to the (iii) contamination detection technique have a value greater than a third weight corresponding to the (i) contamination detection technique.

9. The cooking apparatus of claim 4, wherein the processor is further configured to execute the instructions to cause the cooking apparatus to, based on the cooking phase being a phase before cooking or after cooking, identify a weight where a fourth weight corresponding to the fourth contamination detection technique has a value greater than a third weight corresponding to the (i) contamination detection technique, the fourth weight corresponding to the (ii) contamination detection technique, and a fifth weight corresponding to the (iii) contamination detection technique.

10. The cooking apparatus of claim 1, wherein the processor is further configured to execute the instructions to cause the cooking apparatus to, based on identifying that the identified contamination of the image capturer is greater than or equal to a threshold value, provide a user with information about the identified contamination of the image capturer.

11. A method of controlling a cooking apparatus comprising an image capturer, the method comprising:

obtaining an image through the image capturer;

obtaining contamination level information according to a plurality of contamination detection techniques for detecting contamination of the image capturer based on the obtained image;

identifying a first weight corresponding to a first contamination detection technique, among the plurality of contamination detection techniques, of first contamination level information obtained according to the first contamination detection technique, based on at least one of the type of food and a cooking phase;

identifying a second weight corresponding to a second contamination detection technique, among the plurality of contamination detection techniques, of second contamination level information obtained according to the second contamination detection technique based on at least one of the type of food or the cooking phase; and obtaining final contamination level information based on the first contamination level information, the second contamination level information, the first weight, and the second weight.

12. The method of claim 11, wherein the plurality of contamination detection techniques comprise at least one of:

the first contamination detection technique for detecting contamination of the image capturer based on a change in brightness gradient of adjacent pixels in the obtained image, the second contamination detection technique for detecting contamination of the image capturer based on a change in food contour on the obtained image, a third contamination detection technique for detecting contamination of the image capturer based on a change in pixel information of the obtained image, or a fourth contamination detection technique for detecting contamination of the image capturer by detecting reflection light of a lighting included in the cooking apparatus.

13. The method of claim 12, wherein the image capturer comprises:

a camera for capturing the food; and a transparent protection window located between the camera and the food and for protecting the camera from heat and a foreign substance generated by the cooking apparatus, wherein the plurality of contamination detection techniques comprise the fourth contamination detection technique, and the fourth contamination detection technique comprises:

a technique of emitting light generated by a lighting included in the cooking apparatus in a direction of the transparent protection window, and detecting contamination of the image capturer based on reflection light reflected by the transparent protection window.

14. The method of claim 11, wherein the plurality of contamination detection techniques further comprise a (i) contamination detection technique, a (ii) contamination detection technique, a (iii) contamination detection technique, and a (iv) contamination detection technique, wherein the (i) contamination detection technique comprises:

identifying a contamination level of the image capturer to be low based on a reduction amount of a brightness gradient of an adjacent pixel in the obtained image being small, wherein the (ii) contamination detection technique comprises:

a technique of identifying the contamination level of the image capturer to be high based on a sharpness of the food contour being degraded on the obtained image or the change in pixel information corresponding to the food contour increasing, and identifying the contamination level of the image capturer to be low based on the sharpness of the food contour being degraded on the obtained image or the pixel information change corresponding to the food contour being small, wherein the (iii) contamination detection technique comprises:

a technique of identifying the contamination level of the image capturer to be high based on the change in the pixel information increasing in the obtained image, and identifying the contamination level of the image capturer to be low based on the change in the pixel information in the obtained image being small, and wherein the (iv) contamination detection technique comprises:

a technique of identifying the contamination level of the image capturer to be high based on a degree of scattering of a reflection light reflected by a transparent protection window being higher, and identifying the contamination level of the image capturer to be low based on the degree of scattering of the reflection light reflected by the transparent protection window being low, wherein the first contamination detection technique is one of (i), (ii), (iii), and (iv) contamination detection techniques, and the second contamination detection technique is another one of (i), (ii), (iii), and (iv) contamination detection techniques.

15. The method of claim 14, wherein the obtaining the contamination level information comprises:

identifying the contamination level of the image capturer by areas based on the obtained image; and obtaining the final contamination level information by areas based on the identified contamination level by areas.

* * * * *